(12) United States Patent
Andersson et al.

(10) Patent No.: US 6,251,204 B1
(45) Date of Patent: Jun. 26, 2001

(54) TIRE RETREADING MACHINE

(75) Inventors: Thomas Andersson, Tvaaker; Emil Willi Reppel, Falkenberg, both of (SE)

(73) Assignee: Recamic S.A., Givisiez (CH)

( * ) Notice: Subject to any disclaimer, the term of this patent is extended or adjusted under 35 U.S.C. 154(b) by 0 days.

(21) Appl. No.: 09/303,923

(22) Filed: May 3, 1999

(30) Foreign Application Priority Data

May 5, 1998 (FR) .................................................. 98 05993

(51) Int. Cl.⁷ .................................................. B29D 30/54
(52) U.S. Cl. .............................. 156/96; 156/909; 157/13; 425/17; 425/19
(58) Field of Search .................. 425/17, 19; 156/96, 156/909; 157/13

(56) References Cited

U.S. PATENT DOCUMENTS

| | | | | |
|---|---|---|---|---|
| 2,009,524 | * | 7/1935 | Schmidt | 157/13 |
| 2,392,667 | * | 1/1946 | Hawkinson | 451/227 |
| 3,331,412 | * | 7/1967 | Sorensen | 157/14 |
| 3,675,706 | * | 7/1972 | Cahill | 157/13 |
| 3,867,792 | | 2/1975 | Pelletier | 157/13 |
| 3,930,529 | | 1/1976 | Fawcett et al. | 157/13 |
| 3,980,120 | * | 9/1976 | Fawcett et al. | 157/13 |
| 4,036,677 | | 7/1977 | Marangoni | 156/394 |
| 4,240,851 | * | 12/1980 | King | 156/96 |
| 4,490,197 | | 12/1984 | Bajer | 156/64 |
| 5,218,789 | * | 6/1993 | Ino et al. | 51/165 R |
| 5,256,445 | | 10/1993 | Nojiri et al. | 427/155 |
| 5,307,854 | * | 5/1994 | Brewer | 157/13 |
| 5,364,490 | * | 11/1994 | Hilke et al. | 156/396 |
| 5,635,015 | * | 6/1997 | Longo et al. | 156/380.9 |
| 5,792,334 | * | 8/1998 | Asai et al. | 205/206 |

FOREIGN PATENT DOCUMENTS

| | | |
|---|---|---|
| 1528470 | 11/1971 | (AU) . |
| 1779386 | 9/1971 | (DE) . |
| 0704296 | 4/1996 | (EP) . |
| 1118825 * | 9/1966 | (GB) . |

* cited by examiner

Primary Examiner—Robert Davis
Assistant Examiner—Joseph S Del Sole
(74) Attorney, Agent, or Firm—Baker Botts L.L.P.

(57) ABSTRACT

A machine for retreading tires, including a rotary chuck on which the tire to be treated is mounted and buffing tools, in which the chuck is mounted on a first carriage guided in rails and moved by a first motor, the buffing tools are carried by a second carriage guided in rails oriented parallel to the axis of rotation of the chuck and moved by a second motor, and in which provision is made for precisely positioning the first carriage relative to the second carriage and any relative displacement between the axis of rotation of the chuck and the center of the buffing tools is contained in a single plane passing through the axis of rotation of said chuck.

11 Claims, 4 Drawing Sheets

TIRE RETREADING MACHINE

BACKGROUND OF INVENTION

The present invention relates to a machine for retreading tires; the invention concerns, in particular, a buffer as well as a combined machine further containing means for application and rolling down of the treads.

It is known that most tires can be retreaded, that is, it is possible—after normal wear of the tread —to replace that tread and even some of the plies reinforcing the belt of the tire. Such operations are very common for truck tires; they can be carried out in factories or at relatively large shops.

Numerous machines designed to remove remains of the tread from worn tires, a "detreading" operation, have been proposed. Among them, many use a buffer to carry out that detreading.

Such a buffer consists of a series of blades containing cutting teeth on the outside and arranged side by side. Such a machine is disclosed in U.S. Pat. No. 4,116,256. Those machines often contain complex adjustments for enabling the whole variety of necessary buffing profiles to be obtained.

More or less complex machines making it possible to reduce the different detreading or buffing and retreading operations, without resorting to overly frequent adjustments or repairs, have also been imagined. For example, U.S. Pat. No. 4,036,677 and French Patent 2,271,037, based on an Italian priority of May 14, 1974, describe an "all-purpose" machine comprising a rotary chuck on which the tire to be detreaded-retreaded is mounted, carcass buffing tools, a coaxial radial expander with the chuck, which brings the new tread around the carcass in the form of a ring, and means for rolling down in order to make the new tread adhere to the carcass.

The tire treated remains on the same chuck during buffing and molding, that is, application of the new tread, but without any interaction of the different parts of the machine, which results in a redundancy of drive units, and the need to mark several times the respective positions of the carcass and of the tread of the tire in the course of the successive operations.

The new tread can also be cut to the desired length and placed continuously on the carcass and then butted, that is, its two ends, once joined, are welded; a machine of that type is described in patent EP 0,704,296, but that machines carries out only the application of the new tread on the tire, the so-called "molding" operation.

SUMMARY OF THE INVENTION

According to the invention, a machine for retreading tires comprises a rotary chuck on which the tire to be treated is mounted and buffing tools. The machine is characterized in that the chuck is mounted on a first carriage guided in rails and moved by a first motor, in that the buffing tools are borne by a second carriage guided in rails oriented parallel to the axis of rotation of said chuck and moved by a second motor, in that means are provided for precisely positioning the first carriage relative to the second carriage and in that any relative displacement between the axis of rotation of the chuck and the center of the buffing tools is contained in a single plane passing through the axis of rotation of said chuck.

Such a machine makes it possible, by the combination of two simple translational movements, to obtain buffing profiles of the surface of the crown of a tire. The fact that any relative displacement between the axis of rotation of the chuck and the center of the buffing tools is contained in a single plane passing through the axis of rotation of the chuck has the advantage of remarkably simplifying the interpretation of each displacement, since any moving closer, by five millimeters, for example, will correspond to a reduction of radius of the tire precisely equal to five millimeters. Any relative displacement can thus be directly linked to a thickness of rubber to be removed.

According to one preferred embodiment, the first carriage is guided in vertical rails and the second carriage is guided in horizontal rails. The buffing tools are also preferably placed above the tire. This arrangement makes possible a saving of floor space.

According to an additional characteristic, the machine of the invention contains means for reversing the direction of rotation of the buffing tools. It can also embody additional means for setting parameters for the number of tires treated after which the direction of rotation of the buffing tools is reversed.

This characteristic has the advantage of optimizing wear of the buffing tools and of simplifying use of the machine. In fact, it is well known that the blades of a buffer wear irregularly on operation. Consequently, on the known machines, after having detreaded a given number of tires, in the order of 15 to 20, the blades of the buffer are usually removed, they are turned 180° (and they are remounted. This operation is particularly tedious. The machine according to the invention makes it possible to accomplish this by a simple reversal of the direction of rotation of the buffer, for example, after every three to ten tires have been treated, and the reversal can be accomplished automatically.

In case the machine according to the invention has to treat only tires recapped with flat treads, the axis of rotation of the buffer can be arranged parallel to the axis of rotation of the chuck. In that case, it is advantageous to reverse the direction of rotation of the machine automatically at the same time as the direction of rotation of the buffer is reversed. Of course, the direction of rotation of the tire and that of the buffer are identical in order to obtain a tangential speed on the surface of maximum contact.

When said machine must also detread tires which are to receive treads having tapered wings, usually called "bandes a bavettes," these wings having to cover the shoulders and the height of the sides of the tires, it is advantageous to have the direction of rotation of the buffer perpendicular to the axis of rotation of the chuck.

This arrangement has the advantage of making it possible to treat all parts of the crown and shoulders of the tires by simple combination of both vertical movement of the chuck and horizontal movement of the buffing tools in very simple fashion. In that case, it is not necessary to reverse the direction of rotation of the chuck of the tire when the direction of rotation of the buffing tools is reversed.

The invention also concerns a similar machine further equipped with means for application of a tread and means for rolling down said tread after its application. Said means for application and said means for rolling down are carried by the second carriage and can be the same means.

The machine also makes it possible to combine all the means necessary for detreading and molding of a worn tire with a very low space requirement. Use of the same carriage for moving the buffing tools as well as the means of application and rolling down of the new tread also makes it possible to use the same markings for all the retreading operations; it is not necessary to use additional means of measurement.

The machine preferably also contains means for separating the position of the application and rolling down means from the movement of said second carriage. This makes it possible, notably, to place the buffing tools axially away from the tire during the molding operations. This is very important in order to guarantee that there will be no contamination of the surface of the tire, for example, during the usual operations of rubber coating, placement of the bonding rubber or application of the new tread. Such contamination by particles coming off the blades of the buffer would be unacceptable.

The invention further concerns a machine for retreading tires comprising a rotary chuck on which the tire to be treated is mounted, means of application of a tread and means of rolling down said tread after its application, characterized in that the chuck is mounted on a first carriage guided in vertical rails and moved by a first motor, in that the means of application of a tread and the means of rolling down said tread after its applications are borne by a second carriage guided in horizontal rails oriented parallel to the axis of rotation of said chuck and moved by a second motor, and in that means are provided for precisely positioning the first carriage relative to the second carriage.

DESCRIPTION OF THE DRAWINGS

A working example of the invention, given without limitation, will be described in detail, referring to the attached drawings, in which.

DESCRIPTION OF PREFERRED EMBODIMENTS

Figure 1:
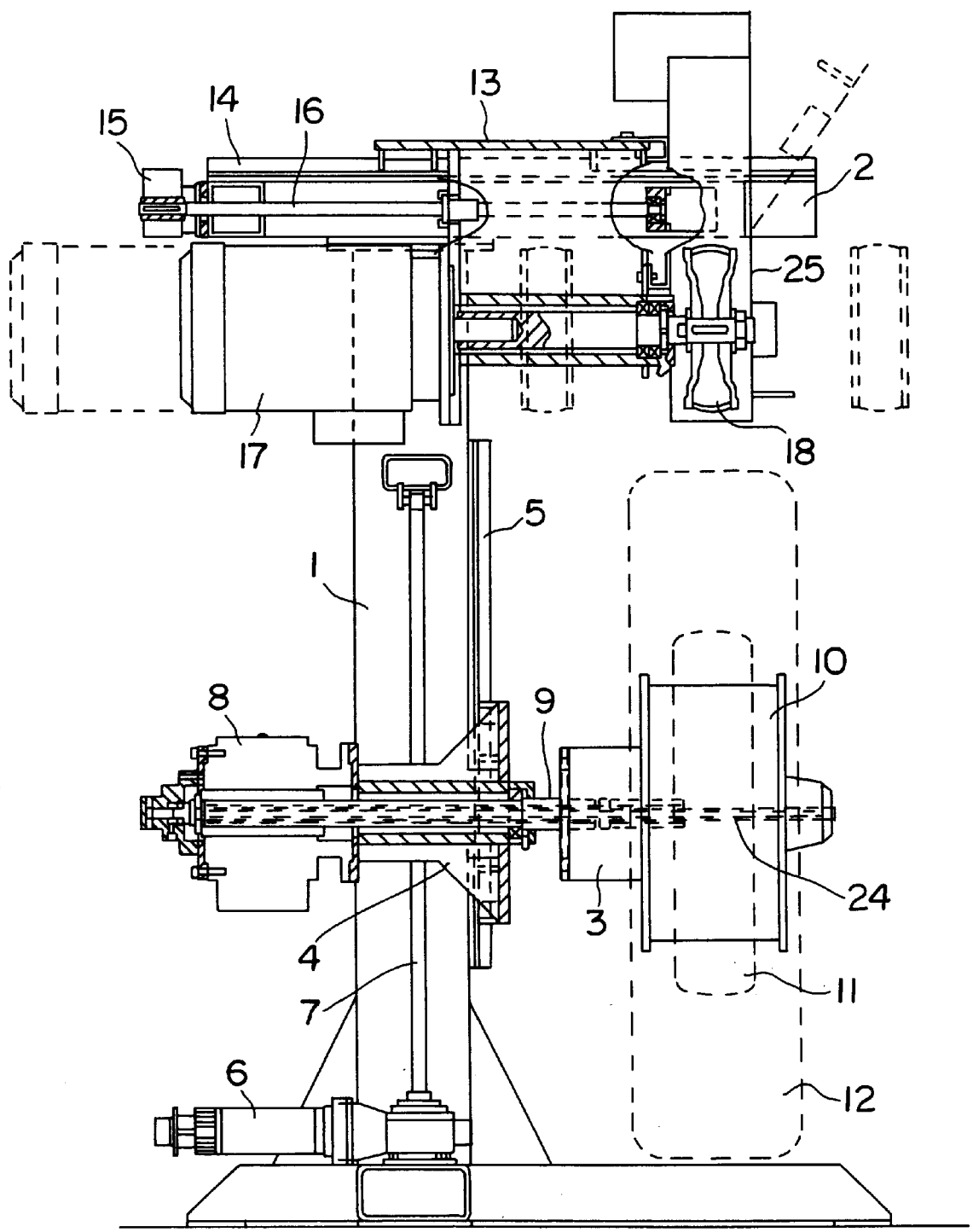
FIG. 1 is a view in vertical section of a detreading-retreading machine according to the invention.
Figure 2:
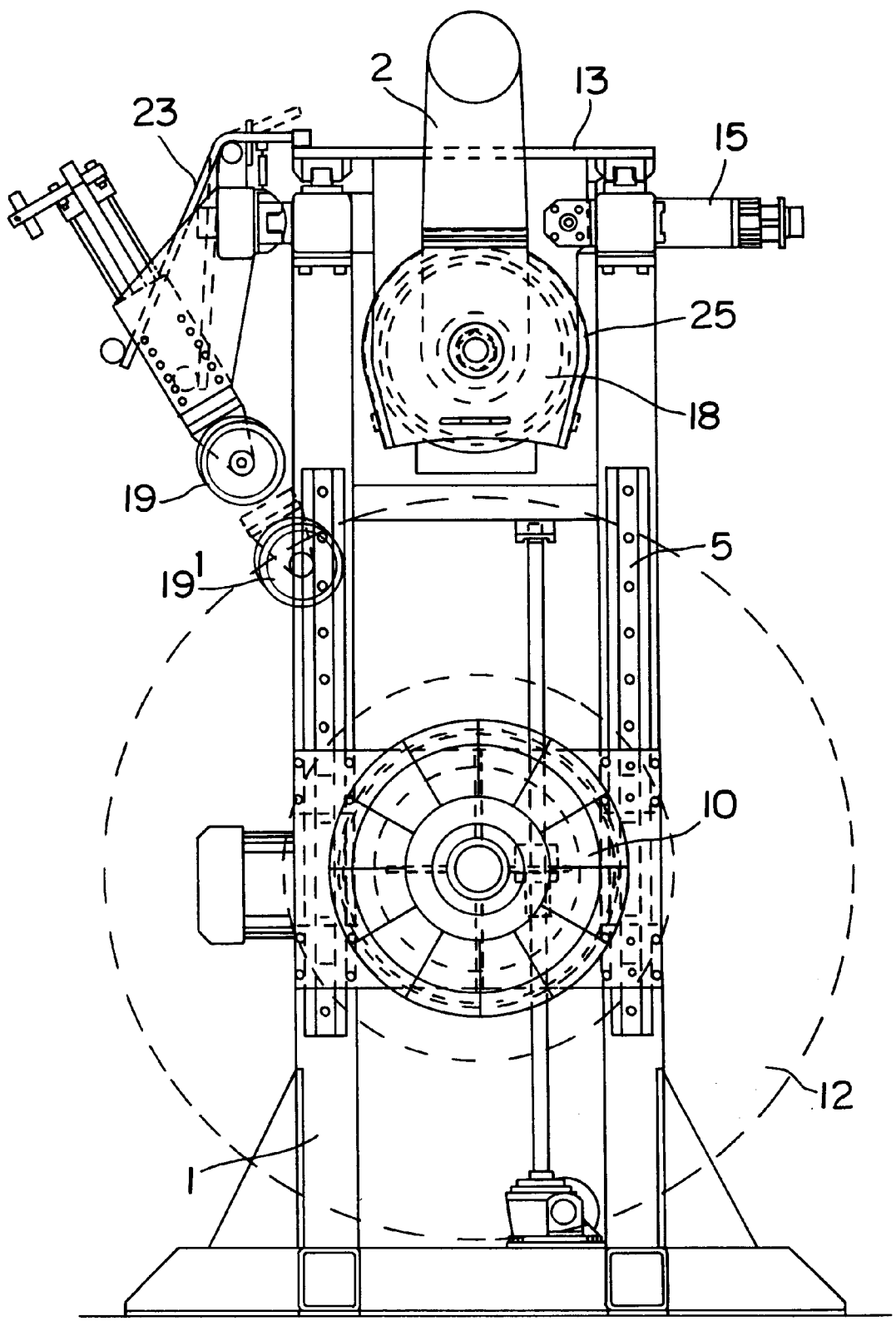
FIG. 2 is a side view in vertical section of the same machine.
Figure 3:
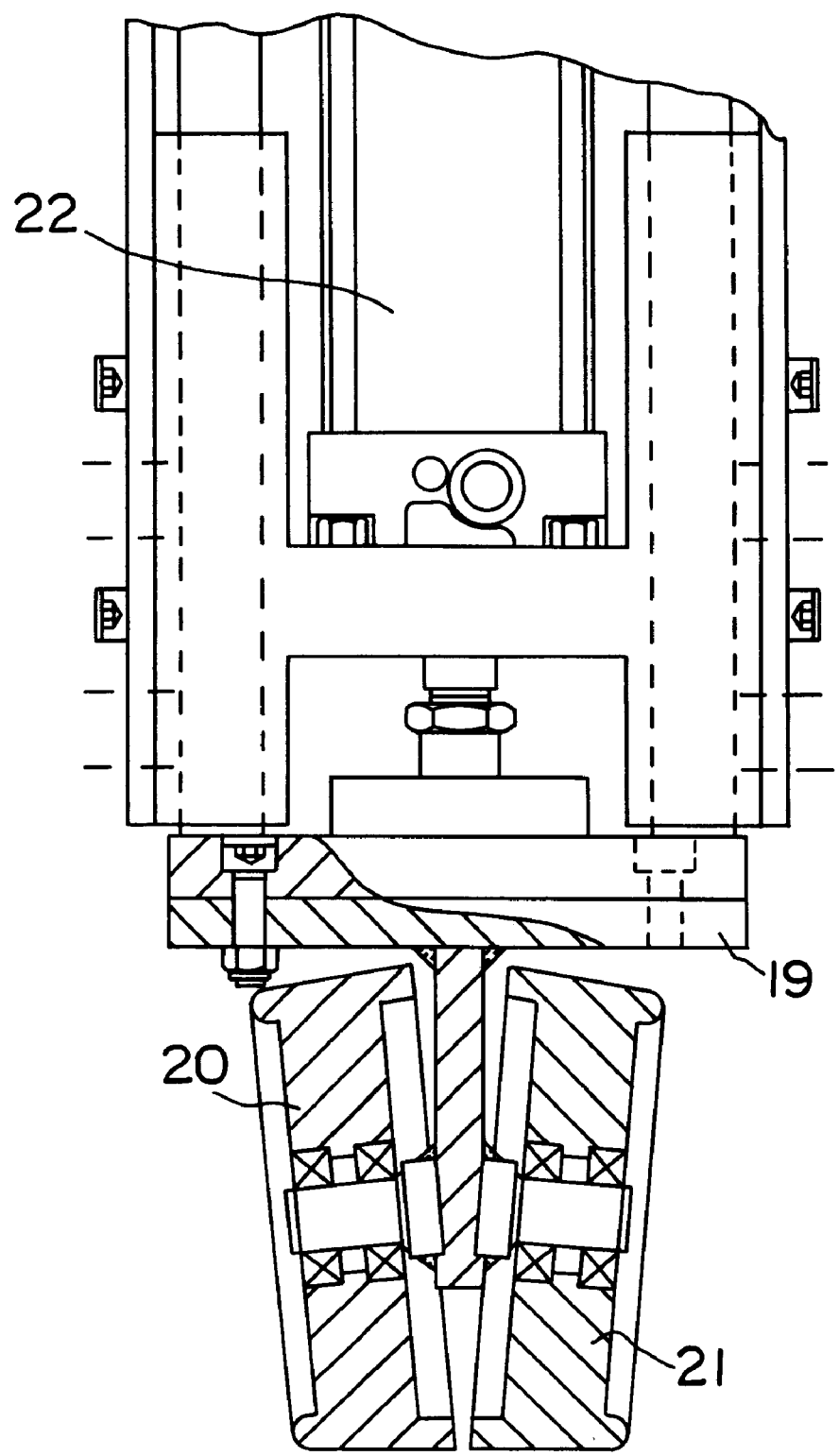
FIG. 3 is a section on a larger scale of the means for application and rolling down of the new tread.

FIGS. 1 to 3 show a detreading-retreading machine according to the invention. The machine includes buffing tools as well as means of application and rolling down of a new tread. Such a machine is intended for small shops for which the combination of buffing and molding operations on the same work station entails a saving of space and time. On the other hand, for larger shops, it is advantageous to have two machines, a first one with buffing tools and a second with means for application and rolling down of a new tread. In the latter case, these two machines can have identical frames and control means, as described below As can be seen in FIG. 1, the detreading-retreading machine comprises a vertical rigid frame 1 and a horizontal bracket 2. According to the invention, a chuck 3 is mounted on a carriage 4 guided in vertical rails 5 and moved by a step motor 6 and an endless screw 7. The carriage 4 carries a motor 8 mounted on the same shaft 9 as the chuck 3 in order to be able to drive it in rotation.

It can be seen in the drawing that the chuck 3 has an extendible rim 10 making it possible to mount tires 11 or 12 (in dotted lines) of very different sizes, ranging from passenger car to truck tires.

At the top of the machine, on the bracket 2, a second carriage 13 is mounted, guided in horizontal rails 14 and moved by a step motor 15 and an endless screw 16. The carriage 13 supports a motor 17 for operating the buffing tools 18.

In FIG. 1, the buffing tools 18 are arranged above the tire to be treated. One can also see in dotted lines the extreme positions to which the motor 17 and the tools 18 can be moved by the carriage 13. The range of movement of the carriage makes it possible, when the tire detreading or buffing phase is completed, to retract the buffing tools 18 and thus avoid contamination of the treated surface of the tire during the following retreading phases.

FIG. 2 also shows the frame 1 and the bracket 2, the chuck 10 and the tire 12, as well as the carriage 13 and the buffing tools 18. It is to be noted that the protecting cover 25 of the buffing tools 18 is symmetrical, which makes it possible to draw up the dust particles caused by buffing, whatever the direction of rotation of the tools 18. The carriage 13 also carries molding and rolling down means 19 represented in two positions 19 and $19^1$. These means consist of two conical rollers 20 and 21 (FIG. 3) mounted on two cooperating pins forming an angle of approximately 10° and driven by a jack 22 carried by an assembly 23 mounted on the carriage 13. The 10° angle corresponds simply to the fact that with the geometry of the rollers chosen, the surface of contact with the tire is flat. The assembly 23 can be uncoupled from the movement of the carriage, for example, during the tire detreading or buffing phase. The application pressure of the jack 22 can be changed by the operator of the machine according to the elongation of the tread necessary for it to cover the entire circumference of the tire to be retreaded with a correct distribution of its weight.

The exact profile according to which the tire must be detreaded is introduced in the machine by an electronic digital control (not shown), which precisely positions the tools and the tire in the horizontal and vertical directions by means of the step motors 15 and 6.

The operation of the machine on buffing is as follows. After having introduced in the control of the machine the buffing profile corresponding to the type of tire to be retreaded and the application and rolling down means 19 to 23 being uncoupled from the movement of the carriage 13:

- The residual thickness of rubber at the crown of the tires 12 is determined, for example, by drilling a small hole with a flat bit, which does not damage the crown plies, and the thickness of rubber to be removed is put in memory;
- a tire 12 is mounted on the expandable rim 10, it is then inflated through an axial compressed air inlet 24 and it is rotated by the chuck 3 and the motor 8;
- the buffing tools 18 are positioned in the center plane of the tire and they are rotated;
- the tire 12 and chuck 3 of the buffing tools 18 are brought into contact together;
- the distance between the buffing tools 18 and the axis of rotation of the chuck corresponding to the initial diameter of the tire on contact is placed in memory; that reference will be used during all the retreading operations;
- the tire is brought up to the buffing tools one or more times in order to remove that thickness of rubber and the complementary horizontal movement of the carriage 13 and vertical movement of the tire 12 are coordinated in order to obtain the buffing profile of the tire chosen;
- the operation is stopped and the tire is separated from the buffing tools;
- it is removed and another tire to be treated is set in place.

After their buffing, the tires are usually repaired and prepared for the application of a new tread on one or more other known working stations They are then ready for the molding operation on the machine of the invention, the buffing tools being moved to separate them perpendicular to the tire and thus avoid any further contamination due to the particles dropping from the buffing tools:

the tire 12 is again mounted on the rim 10;

preparation is finished, if necessary, by completing the usual operations of repair, rubber coating of the crown surface and application of a bonding rubber on the crown of the tire;

a tread is prepared by cutting it to the desired length, taking into account the initial diameter of the tire and the thickness of rubber removed;

the means for application and rolling down are engaged with the movement of the carriage 13, those means are placed in the center plane of the tire and the pressure of application of the jack 22 is regulated in accordance with elongation of the tread to be obtained in order to cover the entire circumference of the crown;

a first end of the tread is set in place on the crown of the tire by engaging it under the rollers 20 and 21;

the entire tread is set in place by turning the chuck and it is verified, if necessary, that length of the tread is satisfactory;

the pressure of the jack 22 is adjusted to the value provided for rolling down;

the rollers 20 and 21 are firmly applied to the tread on one side and then on the other by movement of the carriage 13 and of the chuck 3.

rotation of the tire is stopped, it is deflated and it is removed.

The machine represented in FIGS. 1 to 3 embodies buffing tools, the axis of rotation of which is parallel to the axis of rotation of the chuck 3. In order to obtain the best buffing efficiency on treatment, the directions of rotation of the chuck and of the buffing tools 18 are the same. This ensures the highest tangential speed of contact. To optimize the wear of the buffing tools, after every three to ten tires have been treated, the directions of rotation of the chuck 3 and of the buffing tools 18 are reversed. The symmetrical cover 25 surrounding the buffing tools is also effective in removing (with suction means not shown) the dust particles created, whatever the direction of rotation of the buffing tools. The number of tires beyond which the directions of rotation are reversed is programmable. This makes it possible to reduce the wear of the buffing tools appreciably and greatly facilitates use of the machine The means for application and rolling down comprise two conical rollers. They could also comprise a single roller. Two rollers can also be used with means provided for progressively separating them from each other symmetrically, while firmly applying them against the surface of the new tread.

The two movements, horizontal and vertical, of the two carriages 4 and 13 are driven by an electronic digital control (not represented) which ensures following of the exact profile according to which the tire is to be detreaded.

It can be seen in FIG. 2 that the detreading tools work vertically above the tire and not at nearly its height, as in the existing machines; this arrangement reduces the cost of the machine and the space required for its use.

It can also be seen that the same means are used for moving and positioning the detreading tools and the means for the application and rolling down of the new tread, which saves on reduction gear and floor space requirements.

Finally, the same precise positioning parameters are used for detreading and retreading, that is, the initial retreading dimension is appreciably identical to the final detreading dimension. Thus, the invention introduces a new judicious arrangement of the different parts of the machine in order to reduce its cost and facilitate its use.

Figure 4:
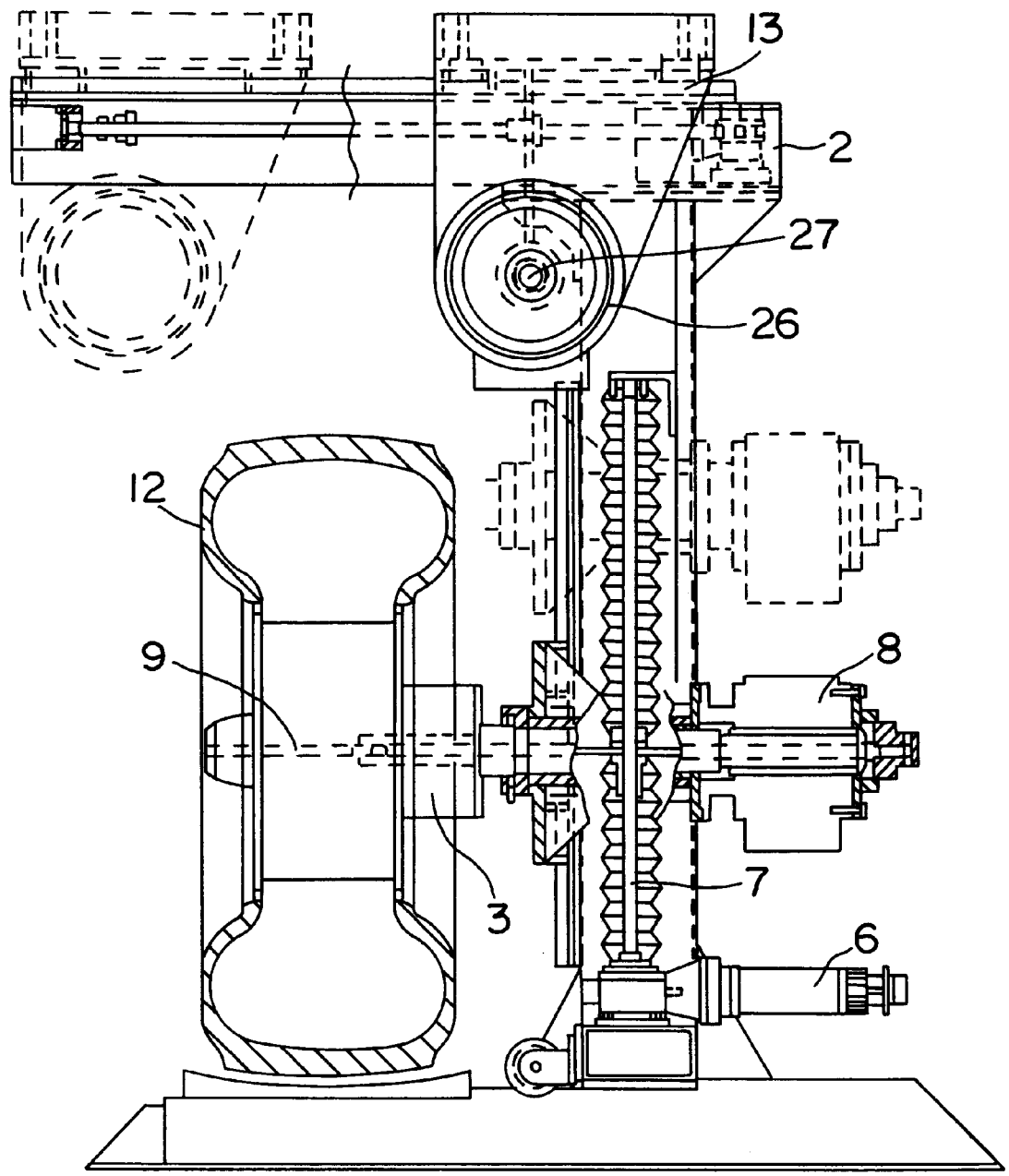
FIG. 4 is a view similar to FIG. 1 of a another embodiment of the invention.

FIG. 4 presents a variant embodiment of a machine according to the invention. In this variant, the buffing tools 26 have their axis of rotation 27 placed perpendicular to the axis of rotation 9 of the chuck 3. The buffing tools are also carried by the carriage 13 and the end positions of movement of those tools 26 can be distinguished in FIG. 4 on both sides of the center plane of the tire 12. This arrangement makes it possible to treat all parts of the crown and shoulders of the tires by combination of the vertical movement of the chuck 3 and horizontal movement of the buffing tools 26.

We claim:

1. A machine for retreading tires comprising a first carriage guided in vertical rails and moved by a first motor, a rotary chuck mounted on said first carriage, a second carriage guided in horizontal rails oriented parallel to the axis of rotation of said chuck, said second carriage being located above the first carriage and moved by a second motor, buffing tools carried by said second carriage, means for precisely positioning said buffing tools relative to said chuck solely by the combined translational movements of said first and second carriages, wherein any relative displacement between the axis of rotation of said chuck and the center of said buffing tools is contained in a single plane passing through the axis of rotation of said chuck, and means adapted to be carried by said second carriage when the second carriage is moved to displace the buffing tools out of operative relationship with a tire for applying a tread on the tire and for rolling down said tread after its application.

2. A machine according to claim 1, including means for reversing the direction of rotation of said buffing tools.

3. A machine according to claim 2, in which the direction of the buffing tools is adapted to be reversed after treating three to ten tires.

4. A machine according to claim 1, in which an axis of rotation of said buffing tools is oriented perpendicular to the axis of rotation of said chuck.

5. A machine according to claim 4, including means for reversing the directions of rotation of said buffing tools and of said chuck.

6. A machine according to claim 1, in which an axis of rotation of said buffing tools is oriented parallel to the axis of rotation of said chuck.

7. A machine according to claim 6, including means for reversing the directions of rotation of said buffing tools and of said chuck.

8. A machine according to claim 1, including a symmetrical cover for protecting the buffing tools.

9. A machine according to claim 1 including means for uncoupling from the second carriage the means for application of the tread and for rolling down the tread.

10. A process for operating a tire buffing machine comprising treating a given number of tires with buffing tools and then reversing the direction of rotation of the buffing tools with the machine for retreading tires of claim 1.

11. A process according to claim 10, wherein the said given number is in the range of 3 to 10.

* * * * *